(12) United States Patent
Sakai (10) Patent No.: US 9,108,265 B2
(45) Date of Patent: Aug. 18, 2015

(54) SPOT WELDING APPARATUS

(75) Inventor: Kensuke Sakai, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 284 days.

(21) Appl. No.: 13/609,063

(22) Filed: Sep. 10, 2012

(65) Prior Publication Data

US 2013/0075378 A1    Mar. 28, 2013

(30) Foreign Application Priority Data

Sep. 27, 2011   (JP) .................................. 2011-210156

(51) Int. Cl.
*B23K 11/11*   (2006.01)
*B23K 11/00*   (2006.01)

(52) U.S. Cl.
CPC ........... *B23K 11/0033* (2013.01); *B23K 11/115* (2013.01)

(58) Field of Classification Search
USPC ........................ 219/87, 89, 90, 91.1, 91.2, 127
See application file for complete search history.

(56) References Cited

U.S. PATENT DOCUMENTS

| 5,866,868 A * | 2/1999 | Hirane | 219/110 |
| 6,515,251 B1 * | 2/2003 | Wind | 219/86.1 |
| 2012/0074104 A1 * | 3/2012 | Goto et al. | 219/117.1 |

FOREIGN PATENT DOCUMENTS

JP        2003-251469 A        9/2003

* cited by examiner

*Primary Examiner* — Brian Jennison
(74) *Attorney, Agent, or Firm* — McGinn IP Law Group, Pllc

(57) ABSTRACT

There is provided a spot welding apparatus. The apparatus includes fixed and movable electrodes to hold and press a workpiece therebetween, and a sub pressure force applicator having a sub pressure unit that moves and selectively stops at a plurality of positions including a sub pressure position where the sub pressure unit is adjacent to the fixed electrode and in contact with the workpiece so as to apply a sub pressure, and a sub-pressure-non-requiring position where the sub pressure unit is located away from the workpiece. Spot welding is performed by applying current between the electrodes while holding the workpiece between the fixed electrode together with the sub pressure unit located in the sub pressure position and the movable electrode. Spot welding is also performed by applying current between the electrodes while holding the sub pressure unit in the sub-pressure-non-requiring position and holding the workpiece between the electrodes.

11 Claims, 8 Drawing Sheets

SPOT WELDING APPARATUS

CROSS-REFERENCE TO RELATED APPLICATIONS

The present application claims priority from Japanese Patent Application No. 2011-210156 filed on Sep. 27, 2011, the entire contents of which are hereby incorporated by reference.

BACKGROUND OF THE INVENTION

1. Field of the Invention

The present invention relates to a spot welding apparatus for spot-welding a workpiece in the form of a plate assembly.

2. Description of the Related Art

Generally, a spot welding technique is widely used for joining stacked plates, such as steel plates. The spot welding technique involves using a pair of welding electrodes to clamp and apply a pressure to the stacked plates, and applying current between the welding electrodes for a predetermined time period.

Figure 7A:
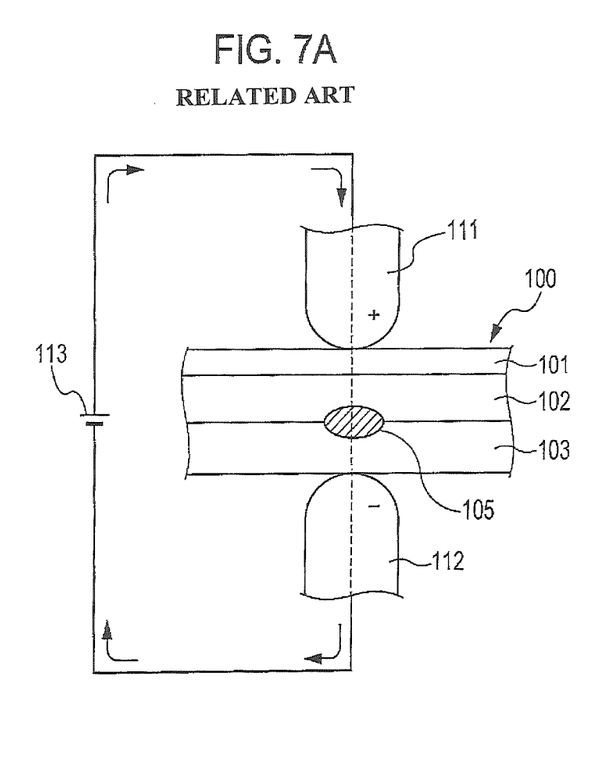
FIGS. 7A and 7B are diagrams schematically illustrating a spot welding process according to related art.

Referring to FIG. 7A, in the case of spot-welding a workpiece 100 in the form of a plate assembly including three stacked plates, i.e., a thin plate 101 having a lower rigidity, and a first thick plate 102 and a second thick plate 103 having a higher rigidity than the thin plate 101, when the workpiece 100 is held and pressed between a movable electrode 111 and a fixed electrode 112, the thin plate 101 having a lower rigidity and the first thick plate 102 bend upward, causing gaps to form between the thin plate 101 and the first thick plate 102 as well as between the first thick plate 102 and the second thick plate 103. In this case, the contact area between the movable electrode 111 and the thin plate 101 is increased due to the bending of the thin plate 101, whereas the contact area of the joint section between the thin plate 101 and the first thick plate 102 and the contact area of the joint section between the first thick plate 102 and the second thick plate 103 are reduced due to the gaps. Therefore, the current density between the movable electrode 111 and the fixed electrode 112 at the second thick plate 103 side becomes higher than that at the thin plate 101 side. This results in a greater local calorific value between the first thick plate 102 and the second thick plate 103 than between the thin plate 101 and the first thick plate 102.

Figure 7B:
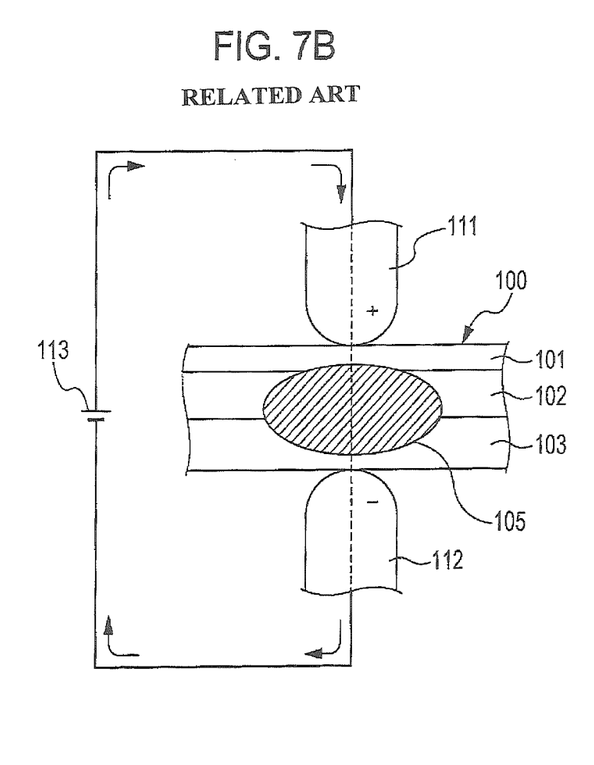

As a result, as shown in FIG. 7A, a nugget 105 is first formed at the joint section between the first thick plate 102 and the second thick plate 103. Then, as shown in FIG. 73, the nugget 105 gradually grows so that the thin plate 101 and the first thick plate 102 are ultimately welded to each other. However, because the amount of weld penetration between the thin plate 101 and the first thick plate 102 is small, the weld strength is poor, and the welding quality varies. This problem becomes prominent particularly when the thickness of the first thick plate 102 and the thickness of the second thick plate 103 are increased since the increased thicknesses make it difficult for the nugget 105 to reach the joint section between the first thick plate 102 and the thin plate 101.

Figure 8:
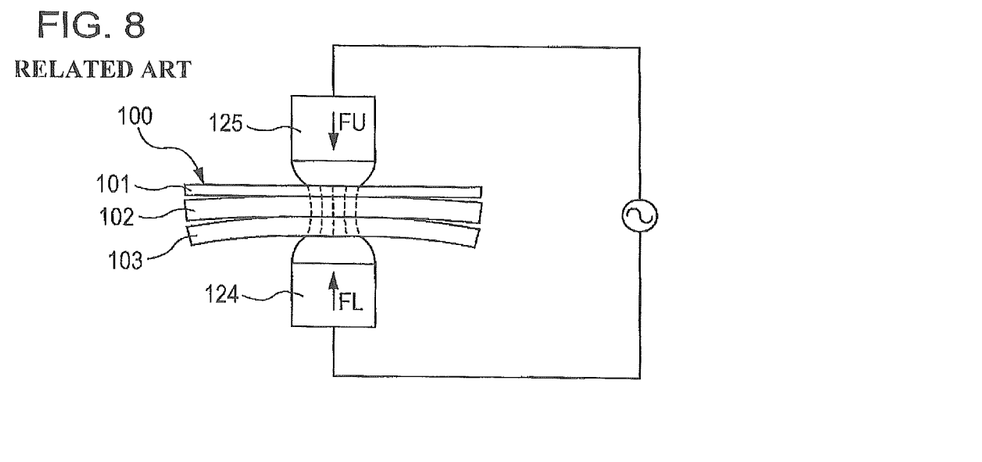
FIG. 8 is a diagram schematically illustrating a spot welding process according to related art.

Japanese Unexamined Patent Application Publication No. 2003-251469 discloses an example of a spot welding method as a countermeasure against this problem. Specifically, as shown in FIG. 8, when spot-welding the workpiece 100 formed of three stacked plates, i.e., the thin plate 101, the first thick plate 102, and the second thick plate 103, a pressure FU of a movable electrode 125 at the thin plate 101 side is set to be lower than a pressure FL of a fixed electrode 124 at the second thick plate 103 side. Thus, the contact resistance between the thin plate 101 and the first thick plate 102 is increased, whereas the contact resistance between the first thick plate 102 and the second thick plate 103 is reduced. Accordingly, when current is applied between the movable electrode 125 and the fixed electrode 124, the calorific value at the joint section between the thin plate 101 and the first thick plate 102 is increased, thereby increasing the weld strength between the thin plate 101 and the first thick plate 102.

Figure 9:
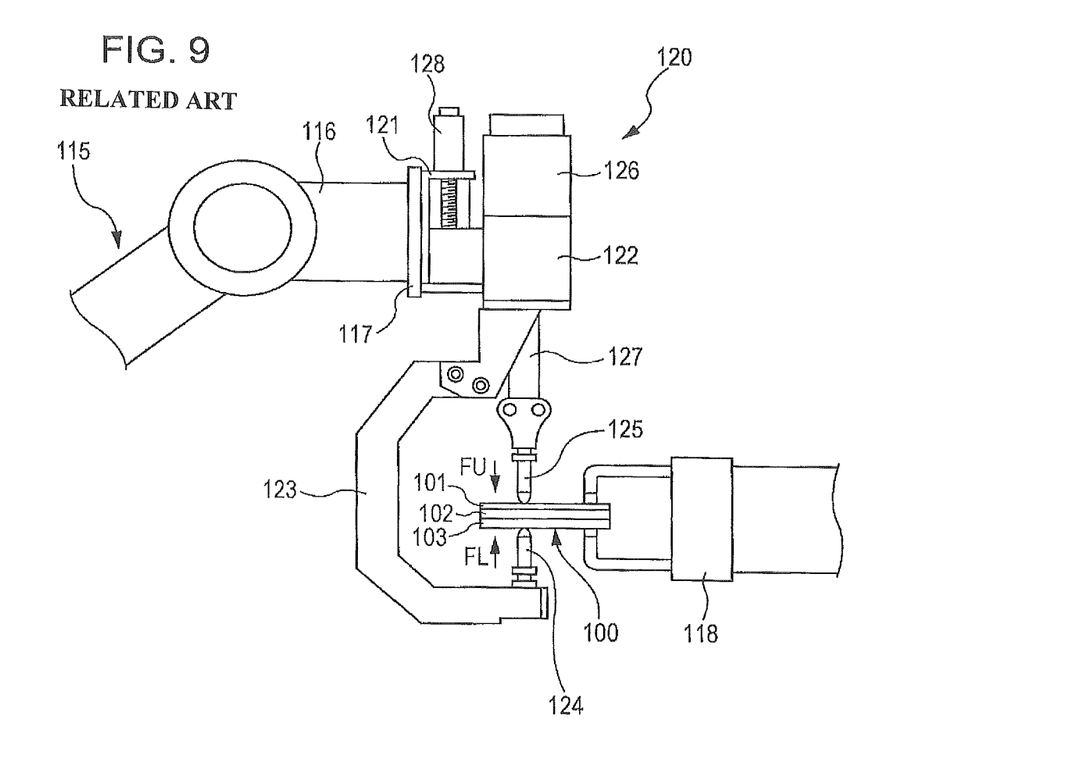
FIG. 9 is a diagram schematically illustrating a spot welding process according to related art.

FIG. 9 illustrates a spot welding apparatus used for implementing this method. Specifically, a spot welding apparatus 120 is attached to a wrist 116 of a welding robot 115. The welding robot 115 moves the spot welding apparatus 120 to each spot position of the workpiece 100 supported by a clamper 118 so as to spot-weld the workpiece 100.

The spot welding apparatus 120 includes a base 122 that is vertically movably supported by a linear guide 121. The linear guide 121 is fixed to a support bracket 117 attached to the wrist 116. A fixed arm 123 extending downward is provided on the base 122. The fixed electrode 124 is provided at a distal end of the fixed arm 123.

A pressure actuator 126 is attached to an upper end of the base 122 and is configured to move a rod 127 vertically. The movable electrode 125 is attached to a lower end of the rod 127 so as to face the fixed electrode 124. A servomotor 128 is attached to an upper end of the support bracket 117. The servomotor 128 is configured to move the base 122 vertically by means of a ball screw mechanism.

Based on teaching data stored in advance in a controller (not shown), the pressure FU of the movable electrode 125 located at the thin plate 101 side is set to be lower than the pressure FL of the fixed electrode 124 (FU<FL).

In order to set the pressure FU of the movable electrode 125 to be lower than the pressure FL of the fixed electrode 124 in this manner, the controller first causes the servomotor 128 to move the base 122 upward so as to bring the fixed electrode 124 into contact with a lower surface of the workpiece 100, and causes the pressure actuator 126 to move the movable electrode 125 downward so as to bring the movable electrode 125 into contact with an upper surface of the workpiece 100.

Subsequently, the base 122 is moved upward by the servomotor 128. When the base 122 is moved upward, the pressure FL of the fixed electrode 124 increases by an amount corresponding to the distance of the upward movement of the base 122, whereby the pressure FU of the movable electrode 125 becomes lower than the pressure FL of the fixed electrode 124 (FU<FL).

As a result, when current is applied between the movable electrode 125 and the fixed electrode 124, the current density at the joint section between the thin plate 101 and the first thick plate 102 becomes high, causing the calorific value to become relatively higher than the calorific value at the joint section between the first thick plate 102 and the second thick plate 103. Consequently, a good uniform nugget is formed that extends from the thin plate 101 to the second thick plate 103, thereby ensuring a high weld strength.

According to the above Japanese Unexamined Patent Application Publication No. 2003-251469, the fixed electrode 124 is brought into contact with the second thick plate 103 of the workpiece 100 held by the clamper 118, and the movable electrode 125 is brought into contact with the thin plate 101. Further, the pressure FU of the movable electrode 125 is set to be lower than the pressure FL of the fixed electrode 124 by moving the base 122 upward. Then, the current density between the thin plate 101 and the first thick plate 102 becomes relatively higher. Thus, a sufficient calorific value can be obtained at the joint section between the thin plate 101 and the first thick plate 103, thereby achieving an increased amount of weld penetration and increased weld strength.

However, when setting the pressure FU of the movable electrode 125 to be lower than the pressure FL of the fixed electrode 124 by moving the base 122 while the workpiece 100 is held by the clamper 118 and is held and pressed between the fixed electrode 124 and the movable electrode 125, a large load is placed on the clamper 118 holding the workpiece 100. On the other hand, if the position of the workpiece 100 held by the clamper 118 and the welding position of the workpiece 100 are markedly distant from each other, the workpiece 100 deforms and bends. This causes the pressure FL of the fixed electrode 124 and the pressure FU of the movable electrode 125 to vary, making it difficult to obtain stable contact resistance between the thin plate 101 and the first thick plate 102 and stable contact resistance between the first thick plate 102 and the second thick plate 103. This may result in variations in the current density at the joint sections, leading to reduced spot welding quality.

SUMMARY OF THE INVENTION

Accordingly, it is an object of the present invention to provide a spot welding apparatus that can achieve high welding quality when spot-welding a workpiece in the form of a plate assembly including stacked plates.

According to an aspect of the present invention, there is provided a spot welding apparatus including a first welding electrode; a second welding electrode that is disposed to face the first welding electrode and is configured to clamp and press a workpiece together with the first welding electrode; and a sub pressure applicator that includes a sub pressure applying actuator and a sub pressure unit, and is configured to move and selectively stop the sub pressure unit at a plurality of movement stop positions using the sub pressure applying actuator, the movement stop positions including a sub pressure position where the sub pressure unit is adjacent to the first welding electrode and in contact with the workpiece so as to apply a sub pressure to the workpiece, and a sub-pressure-non-requiring position where the sub pressure unit is located away from the workpiece, wherein sub-pressure-application spot welding and sub-pressure-application-non-requiring spot welding are executable, the sub-pressure-application spot welding being a process in which spot welding is performed by applying current between the first welding electrode and the second welding electrode while the workpiece is clamped and pressed between the first welding electrode and the sub pressure unit in the sub pressure position, which are in contact with the workpiece, and the second welding electrode, which is in contact with the workpiece while facing the first welding electrode, the sub-pressure-application-non-requiring spot welding being a process in which spot welding is performed by applying current between the first welding electrode and the second welding electrode while the sub pressure unit is held in the sub-pressure-non-requiring position and the workpiece is clamped and pressed between the first welding electrode, which is in contact with the workpiece, and the second welding electrode, which is in contact with the workpiece while facing the first welding electrode.

According to the above aspect, in sub-pressure-application spot welding in which the sub pressure unit of the sub pressure applicator is switched to the sub pressure position, a pressure of the first welding electrode and a sub pressure of the sub pressure unit exerted by the sub pressure applying actuator are applied to the workpiece, while a pressure of the second welding electrode facing the first welding electrode is applied to the workpiece. That is, the pressure of the first welding electrode is lower than the pressure of the second welding electrode. Accordingly, when current is applied between the first welding electrode and the second welding electrode while clamping and pressing, e.g., a workpiece formed of a thin plate having a lower rigidity and first and second thick plates having a higher rigidity than the thin plate that are stacked on top of one another, the current density at a joint section between the thin plate and the first thick plate is relatively higher. Accordingly, it is possible to achieve high welding quality when welding the workpiece.

Further, in sub-pressure-application-non-requiring spot welding in which the sub pressure unit of the sub pressure applicator is switched to the sub-pressure-non-requiring position, the sub pressure unit is held in the sub-pressure-non-requiring position where the sub pressure unit is located away from the workpiece, and the opposing first welding electrode and second welding electrode apply pressures of the same magnitude to the workpiece. Accordingly, when current is applied between the first welding electrode and the second welding electrode while clamping and pressing a workpiece that requires pressures of the same magnitude to be applied thereto by the first welding electrode and the second welding electrode, e.g., a workpiece formed of a thin plate having a lower rigidity and first and second thick plates having a higher rigidity than the thin plate and disposed on opposite side of the thin plate, the current density at a joint section between the first thick plate and the thin plate and the current density at a joint section between the second thick plate and the thin plate become equal to each other. Accordingly, it is possible to achieve high welding quality when welding the workpiece.

In the spot welding apparatus described above, the plurality of movement stop positions may include the sub pressure position where the sub pressure unit is in contact with the workpiece so as to apply the sub pressure to the workpiece, a retracted position where the sub pressure unit is located away from the workpiece so as to be retracted from the sub pressure position, and the sub-pressure-non-requiring position. Further, a distance that the sub pressure unit moves from the sub pressure position to the sub-pressure-non-requiring position may be greater than a distance that the sub pressure unit moves from the sub pressing position to the retracted position.

According to the configuration described above, the distance that the sub pressure unit moves from the sub pressure position to the sub-pressure-non-requiring position is greater than the distance that the sub pressure unit moves from the retracted position to the sub pressure position where the sub pressure unit is in contact with the workpiece so as to apply the sub pressure to the workpiece in the sub-pressure-application spot welding. Therefore, in the sub-pressure-application-non-requiring spot welding, the sub pressure unit is spaced relatively far away from a spot position of the workpiece, making it possible to provide sufficient operating space. Further, the distance that the sub pressure unit moves from the retracted position to the sub pressure position is relatively small, which allows the cycle time of the sub-pressure-application spot welding to be reduced.

In the spot welding apparatus described above, the plurality of movement stop positions may include the sub pressure position where the sub pressure unit is in contact with the workpiece so as to apply the sub pressure to the workpiece, a retracted position where the sub pressure unit is located away from the workpiece so as to be retracted from the sub pressure position, and the sub-pressure-non-requiring position. Further, the retracted position may also serve as the sub-pressure-non-requiring position.

According to the configuration described above, since the retracted position also serves as the sub-pressure-non-requiring position, the number of the movement stop positions of the sub pressure unit is reduced. This makes it possible to simplify the operation control of the sub pressure applicator.

In the spot welding apparatus described above, the sub pressure applicator may be configured to linearly move and selectively stop the sub pressure unit at each of the movement stop positions using the sub pressure applying actuator.

According to the configuration described above, since the sub pressure unit is linearly moved and selectively stopped at each of the plurality of movement stop positions by the sub pressure applying actuator, it is possible to simplify operations of the sub pressure applicator, and thus simplify the configuration of the sub pressure applicator.

According to an embodiment of the present invention, in sub-pressure-application spot welding in which the sub pressure unit of the sub pressure applicator is switched to the sub pressure position, a pressure of the first welding electrode and a sub pressure of the sub pressure unit exerted by the sub pressure applying actuator are applied to the workpiece, while a pressure of the second welding electrode facing the first welding electrode is applied to the workpiece. That is, the pressure of the first welding electrode is lower than the pressure of the second welding electrode. Accordingly, it is possible to achieve high welding quality when welding a workpiece formed of stacked plates of different rigidity.

Further, in sub-pressure-application-non-requiring spot welding in which the sub pressure unit of the sub pressure applicator is switched to the sub-pressure-non-requiring position, the sub pressure unit is held in the sub-pressure-non-requiring position where the sub pressure unit is located away from the workpiece, and the opposing first welding electrode and second welding electrode apply pressures of the same magnitude to the workpiece. Accordingly, it is possible to achieve high welding quality when welding a workpiece that requires pressures of the same magnitude to be applied thereto by the first welding electrode and the second welding electrode.

DESCRIPTION OF THE PREFERRED EMBODIMENTS

Figure 1:
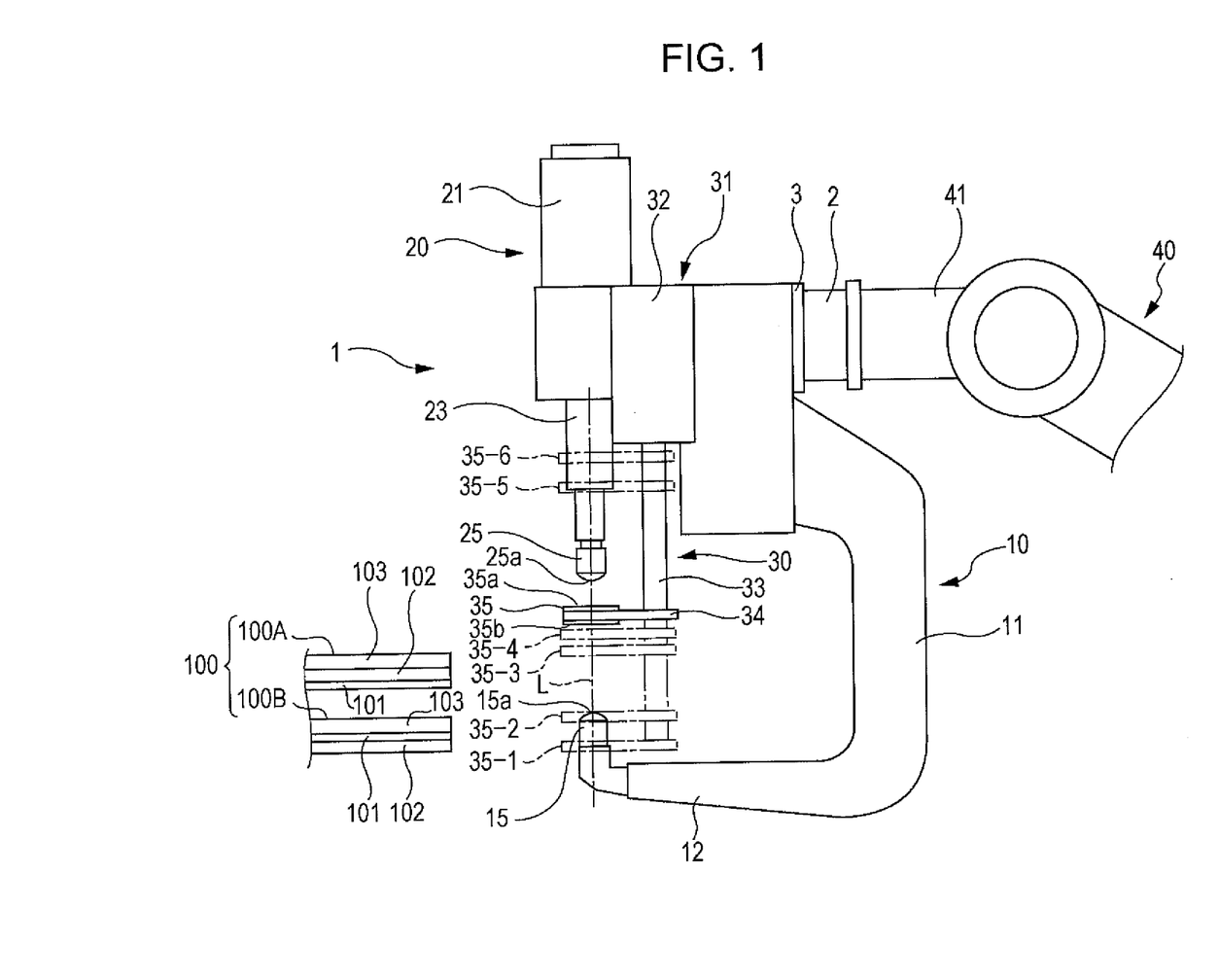
FIG. 1 is a diagram illustrating the configuration of a spot welding apparatus according to an embodiment.

An embodiment of the present invention will be described with reference to FIGS. 1 through 6. FIG. 1 is a diagram illustrating the configuration of a spot welding apparatus 1. FIGS. 2A through 6 are schematic operational diagrams. In the following description of the spot welding apparatus 1, for purposes of simplicity of explanation, the upward and downward directions in FIG. 1 are defined as the upward and downward directions of the spot welding apparatus 1, respectively.

Before describing the spot welding apparatus 1, workpieces will be described first. Workpieces used in this embodiment include a workpiece 100A that requires pressures of different magnitudes to be applied thereto by electrodes when spot welding is performed and a workpiece 100B that requires pressures of the same magnitude to be applied thereto by electrodes. As shown in FIG. 1, the workpiece 100A is a three-plate assembly including a thin plate 101 having a lower rigidity, and a first thick plate 102 and a second thick plate 103 having a greater thickness and a higher rigidity than the thin plate 101, which are stacked sequentially. On the other hand, the workpiece 100B is a three-plate assembly including a thin plate 101 having a lower rigidity, and a first thick plate 102 and a second thick plate 103 having a higher rigidity and disposed on opposite sides of the thin plate 101. The workpiece 100A and the workpiece 100B may be referred to as a workpiece 100, when the workpiece 100A and the workpiece 100B are not distinguished from one another.

In the spot welding apparatus 1, a fixed arm 10, a pressure actuator 20, a sub pressure applicator 30, and a welding transformer (not shown) are mounted on a support bracket 3, which is attached to a wrist 41 of a welding robot 40 with an equalizer unit 2 interposed therebetween.

The fixed arm 10 includes a fixed arm main body 11 extending downward and having a base end connected to the support bracket 3, and an electrode holder 12 formed at a distal end of the fixed arm main body 11 and bending in an L shape. A fixed electrode 15 serving as a first welding electrode is attached, with a tip end 15a facing upward, to the electrode holder 12.

The pressure actuator 20 includes a servomotor 21 and an unillustrated linear motion unit including a ball screw mechanism or the like. A rod of the linear motion unit is reciprocated vertically by the servomotor 21. An electrode arm 23 is attached to a lower end of the rod of the linear motion unit. A movable electrode 25 serving as a second welding electrode, is disposed at a distal end of the electrode arm 23. The movable electrode 25 is coaxially aligned with the fixed electrode 15 on the fixed arm 10, i.e., is arranged on a central axis L, so as to face the fixed electrode 15. Thus, the movable electrode 25 is moved by the servomotor 21 along the central axis L between a retracted position defined as an upper movement end where the movable electrode 25 is located above and away from the fixed electrode 15 and a pressing position where the movable electrode 25 holds the workpiece 100 together with the fixed electrode 15 and applies a pressure to the workpiece 100. This pressure is dependent on the rotational torque of the servomotor 21. Accordingly, the pressure of a desired magnitude can be obtained by controlling the rotational torque of the servomotor 21.

Sub pressure applicator 30 includes a sub pressure applying actuator 31, which includes a servomotor 32 mounted on the support bracket 3, and an unillustrated linear motion unit including a ball screw mechanism or the like. A rod of the linear motion unit is vertically reciprocated by the servomotor 32. A sub pressure applying arm 34 is connected to a distal end of the rod with a movable shaft 33 interposed therebetween. The movable shaft 33 extends parallel to the central axis L.

The sub pressure applying arm 34 has a base end connected to a distal end of the movable shaft 33, and has a distal extending toward the central axis L. A sub pressure unit 35 is provided at the distal end of the sub pressure applying arm 34. The sub pressure unit 35 is coaxially aligned with the central axis L, has an upper end 35a and a lower end 35b projecting upward and downward, respectively, from the distal end of the sub pressure applying arm 34, and has a semicircular cross-sectional shape, i.e., a semi-cylindrical shape that allows the fixed electrode 15 and the movable electrode 25 to extend therethrough.

The sub pressure applicator 30 having the configuration described above causes the servomotor 32 of the sub pressure applying actuator 31 to move the movable shaft 33 and thereby vertically move the sub pressure unit 35 provided at the distal end of the sub pressure applying arm 34 along the central axis L, and selectively stop the sub pressure unit 35 at each of a plurality of movement stop positions, i.e., a first retracted position 35-1 where the upper end 35a of the sub pressure unit 35 is located below the tip end 15a of the fixed electrode 15, a first sub pressure position 35-2 where the sub pressure unit 35 is in pressure contact from below with the workpiece 100 held between the fixed electrode 15 and the movable electrode 25 and applies a sub pressure Fα to the workpiece 100, a second sub pressure position 35-3 where the sub pressure unit 35 is in pressure contact from above with the workpiece 100 held between the fixed electrode 15 and the movable electrode 25 and applies a sub pressure Fα to the workpiece 100, a second retracted position 35-4 where the sub pressure unit 35 is located above and away from the workpiece 100 held between the fixed electrode 15 and the movable electrode 25, a sub-pressure-non-requiring position 35-5 located above the second retracted position 35-4, and a retreat position 35-6 located further above the sub-pressure-non-requiring position 35-5.

With this configuration, it is possible to switch between sub-pressure-application spot welding in which spot welding is performed by applying current between the fixed electrode 15 and the movable electrode 25 while applying the sub pressure Fα to the workpiece 100 by the sub pressure unit 35 located in the first sub pressure position 35-2 or the second sub pressure position 35-3 and sub-pressure-application-non-requiring spot welding in which spot welding is performed by applying current between the fixed electrode 15 and the movable electrode 25 while holding the sub pressure unit 35 in the sub-pressure-non-requiring position 35-5. That is, both the sub-pressure-application spot welding and the sub-pressure-application-non-requiring spot welding are executable.

The sub pressure Fα applied by the sub pressure unit 35 located in the first sub pressure position 35-2 or the second sub pressure position 35-3 is dependent on the rotational torque of the servomotor 32. Accordingly, the sub pressure Fα of a desired magnitude can be obtained by controlling the rotational torque of the servomotor 32.

The distance from the first sub pressure position 35-2 to the sub-pressure-non-requiring position 35-5 and the distance from the second sub pressure position 35-3 to the sub-pressure-non-requiring position 35-5 in the sub-pressure-application spot welding are greater than the distance that the sub pressure unit 35 moves from the first retracted position 35-1 to the first sub pressure position 35-2 where the sub pressure unit is in contact with the workpiece 100 so as to apply the sub pressure Fα to the workpiece 100 and the distance that the sub pressure unit 35 moves from the second retracted position 35-4 to the second sub pressure position 35-3 where the sub pressure unit 35 is in contact with the workpiece 100 so as to apply the sub pressure Fα to the workpiece 100, respectively. Therefore, when performing sub-pressure-application-non-requiring spot welding, the workpiece 100 is spaced relatively far away from the workpiece 100, making it possible to provide sufficient operating space.

As described above, since the distance that the sub pressure unit 35 moves from the first retracted position 35-1 to the first sub pressure position 35-2 and the distance that the sub pressure unit 35 moves from the second retracted position 35-4 to the second sub pressure position 35-3 are relatively small, the distance that the sub pressure unit 35 moves upon performing sub-pressure-application spot welding is relatively small, which allows the cycle time of the sub-pressure-application spot welding to be reduced.

Further, since the sub pressure applying actuator 31 linearly moves and selectively stops the sub pressure unit 35 at each of the movement stop positions of the first retracted position 35-1, the first sub pressure position 35-2, the second sub pressure position 35-3, the second retracted position 35-4, the sub-pressure-non-requiring position 35-5, and the retreat position 35-6, the sub pressure applying actuator 31 may have an existing simple structure including the servomotor 32 and a linear motion unit such as a ball screw feed mechanism. This makes it possible to simplify operations of the sub pressure applicator 30, and thus simplify the configuration of the sub pressure applicator 30.

The welding transformer serving as the power source has an output terminal electrically connected to the fixed electrode 15 through a bus bar, the fixed arm 10, etc., and the other output terminal electrically connected to the movable electrode 25 through a bus bar, the electrode arm 23, etc.

Further, a welding-robot controller (not shown) stores teaching data for the welding robot. The teaching data contains an operation program for sequentially spot-welding the welding spots of the workpiece 100, and information on the position and attitude of the spot welding apparatus 1 at each welding spot, i.e., at each welding position. A welding controller (not shown) stores an operation program for the spot welding apparatus 1 and controls operations of the pressure actuator 20, the sub pressure applicator 30, and the welding transformer.

Next, operations of the spot welding apparatus 1 will be described with reference to schematic operational diagrams of FIGS. 2A through 6. In the following, for purposes of simplicity of illustration, sub-pressure-application spot welding for spot-welding a workpiece 100A to be spot welded, which is a plate assembly formed of a thin plate 101, a first thick plate 102, and a second thick plate 103 that are stacked in this order from the bottom, will be described first with reference to FIGS. 2A through 2C. Subsequently, sub-pressure-application spot welding for spot-welding another workpiece 100A to be spot welded, which is a plate assembly formed of a thin plate 101, a first thick plate 102, and a second thick plate 103 that are stacked in this order from the top, will be described with reference to FIGS. 3A through 3C. Then, sub-pressure-application-non-requiring spot welding for spot-welding a workpiece 100E will be described with reference to FIG. 4. After that, electrode grinding will be described with reference to FIGS. 4A through 4C, and maintenance such as replacing electrodes will be described with reference to FIG. 5.

(Sub-pressure-application Spot Welding I)

Upon spot-welding a workpiece 100A formed of a thin plate 101, a first thick plate 102, and a second thick plate 103 that are stacked in this order from the bottom, the movable electrode 25 is moved and held in the retracted position by the servomotor 21 of the spot welding apparatus 1, and the sub pressure unit 35 is moved and held in the first retracted position 35-1 by the servomotor 32 of the sub pressure applicator 30, in accordance with the preset operation program. Then, as shown in FIG. 2A, the robot controller causes the welding robot 40 to position the spot welding apparatus 1 such that the tip end 15a of the fixed electrode 15 comes into contact from below with a spot position, i.e., a welding position of the workpiece 100A.

Figure 2A:
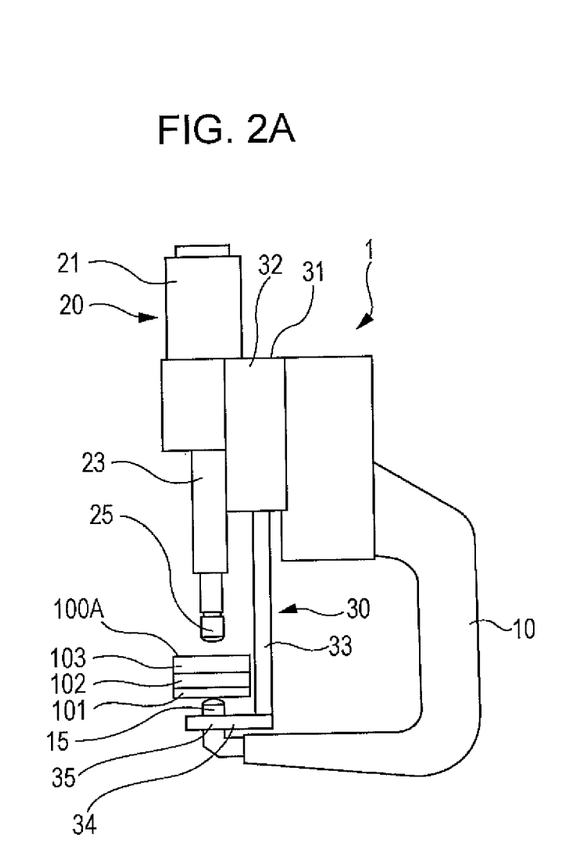
FIGS. 2A through 2C are diagrams schematically illustrating operations of the spot welding apparatus.

As shown in FIG. 2A, when the spot welding apparatus 1 is positioned at the welding position, the tip end 15a of the fixed electrode 15 is in contact with the thin plate 101 of the workpiece 100A from below. On the other hand, a tip end 25a of the movable electrode 25 faces the second thick plate 103 with a gap therebetween, and the upper end 35a of the sub pressure unit 35 faces the thin plate 101 with a gap therebetween.

Figures 2B, 2C:
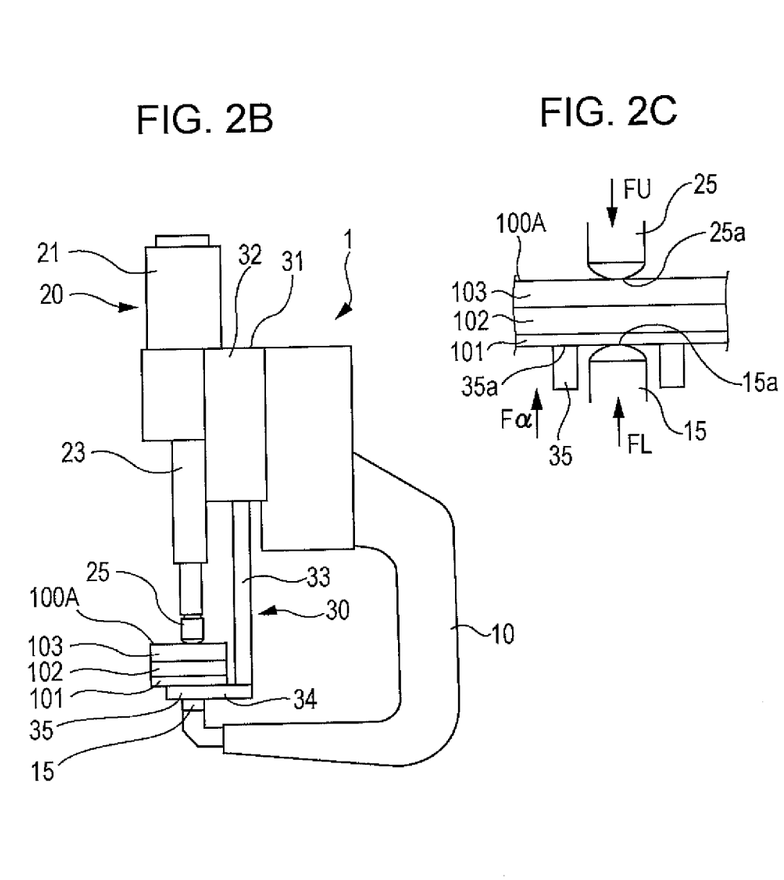

Subsequently, while having the fixed electrode 15 in contact with the thin plate 101 of the workpiece 100A, the movable electrode 25 is moved by the servomotor 21 of the pressure actuator 20 from the retracted position to the pressing position, i.e., toward the fixed electrode 15, so as to be in contact with the second thick plate 103 from above as shown in FIG. 2B. Thus, the fixed electrode 15 and the movable electrode 25 hold the workpiece 100A therebetween. The servomotor 21 is further driven such that the torque reaches a predetermined level, whereby the movable electrode 25 is brought into pressure contact with the second thick plate 103. Thus, the pressure of the pressure actuator 20 is applied to the movable electrode 25 and the fixed electrode 15 via the fixed arm 10, whereby the weld section of the workpiece 100A is held and pressed between the movable electrode 25 and the fixed electrode 15.

Meanwhile, the rod of the linear motion unit is moved upward by the servomotor 32 of the sub pressure applicator 30, whereby the movable shaft 33 and the sub pressure applying arm 34 are moved such that the sub pressure unit 35 provided at the distal end of the sub pressure applying arm 34 moves from the first retracted position 35-1 to the first sub pressure position 35-2 where the upper end 35a is located adjacent to the fixed electrode 15 and is in contact with the thin plate 101 of the workpiece 100A from below. The servomotor 32 is further driven such that the torque reaches a predetermined level, whereby the sub pressure unit 35 applies the sub pressure $F\alpha$ to the thin plate 101.

When the sub pressure $F\alpha$ is applied to the workpiece 100A from below by the sub pressure unit 35 located adjacent to the fixed electrode 15 while holding and pressing the workpiece 100A between the fixed electrode 15 and the movable electrode 25 in the manner as described above, the pressure FU of the movable electrode 25 is applied to the second thick plate 103 from above, and the pressure FL of the fixed electrode 15 and the sub pressure $F\alpha$ of the sub pressure unit 35 are applied next to each other to the thin plate 101, as shown in FIG. 2C.

In this case, as schematically shown in FIG. 2C, the pressure of the pressure actuator 20 is applied to the movable electrode 25, and is also applied to the fixed electrode 15, facing the movable electrode 25, via the fixed arm 10. Meanwhile, an urging force of the servomotor 32 of the sub pressure applicator 30 is applied to the sub pressure unit 35 via the sub pressure applying arm 34, etc. The pressure FU of the movable electrode 25 applied to the second thick plate 103 from above is equal to the sum of the pressure FL of the fixed electrode 15 and the sub pressure $F\alpha$ of the sub pressure unit 35 that are applied to the thin plate 101 from below (FU=FL+$F\alpha$).

Thus, in the weld section of the workpiece 100A, the pressure FU is applied to the second thick plate 103 by the movable electrode 25, and the pressure FL and the sub pressure $F\alpha$ are applied to the thin plate 101 by the fixed electrode 15 and the sub pressure unit 35, respectively. That is, the pressure FL of the fixed electrode 15 applied to the thin plate 101 is equal to a pressure obtained by subtracting the sub pressure $F\alpha$ of the sub pressure unit 35 from the pressure FU of the movable electrode 25 (FL=FU−$F\alpha$).

Since the pressure FL of the fixed electrode 15 applied to the thin plate 101 side is set to be lower than the pressure FU of the movable electrode 25 applied to the second thick plate 103 side (FL<FU) as described above, the contact pressure between the thin plate 101 and the first thick plate 102 becomes less than the contact pressure at the joint section between the first thick plate 102 and the second thick plate 103. Consequently, the contact resistance between the thin plate 101 and the first thick plate 102 becomes relatively higher, whereas the contact resistance between the first thick plate 102 and the second thick plate 103 becomes relatively lower.

Subsequently, while the workpiece 100A is held and pressed between the movable electrode 25 and the fixed electrode 15 together with the sub pressure unit 35 and while the pressure FL of the fixed electrode 15 located at the thin plate 101 side is set to be lower than the pressure FU of the movable electrode 25 located at the second thick plate 103 side, welding is performed by applying current between the movable electrode 25 and the fixed electrode 15 from the welding transformer for a predetermined time period. When current is applied between the movable electrode 25 and the fixed electrode 15, the contact resistance at the joint section between the thin plate 101 and the first thick plate 102 becomes relatively higher, making the current density greater, whereas the contact resistance between the first thick plate 102 and the second thick plate 103 remains small. Thus, the calorific value at the joint section between the thin plate 101 and the first thick plate 102 becomes relatively higher than the calorific value at the joint section between the first thick plate 102 and the second thick plate 103. Consequently, welding is performed without a variation in the current density across the thickness from the thin plate 101 to the second thick plate 103, thereby ensuring high weld strength and welding quality.

After completion of this welding process, the movable shaft 33 is moved downward by the servomotor 32 of the sub pressure applicator 30, whereby the sub pressure unit 35 provided on the sub pressure applying arm 34 is moved from the first sub pressure position 35-2, where the sub pressure unit 35 is in pressure contact with the workpiece 100A, to the first retracted position 35-1. Further, the movable electrode 25 is moved to its retracted position by the servomotor 21 of the pressure actuator 20 such that the workpiece 100A is released from being held by the fixed electrode 15 and the movable electrode 25.

Subsequently, the welding robot 40 is operated in accordance with the operation program sa so as to cause the spot welding apparatus 1 to retract from the spot position of the workpiece 100A and move to the next spot position of the workpiece 100A. Since the distance that the sub pressure unit 35 moves from the first retracted position 35-1 to the first sub pressure position 35-2 is relatively small, it is possible to reduce the time taken for moving the sub pressure unit 35 and thus to reduce the cycle time of the sub-pressure-application spot welding.

(Sub-pressure-application Spot Welding II)

Figure 3A:
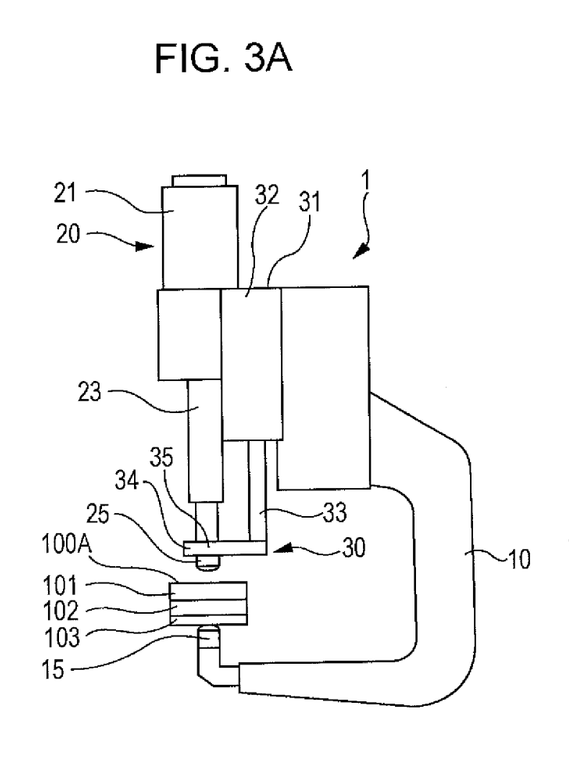
FIGS. 3A through 3C are diagrams schematically illustrating operations of the spot welding apparatus.

Upon spot-welding a workpiece 100A formed of a thin plate 101, a first thick plate 102, and a second thick plate 103 that are stacked in this order from the top, in accordance with a preset program, the movable electrode 25 of the spot welding apparatus 1 is held in its retracted position and the sub pressure unit 35 of the sub pressure applicator 30 is held in the second retracted position 35-4. Then, the welding robot 40 is operated so as to position the spot welding apparatus 1 such that the tip end 15a of the fixed electrode 15 comes into contact from below with a spot position, i.e., a welding position of the workpiece 100A, as shown in FIG. 3A.

Figures 3B, 3C:
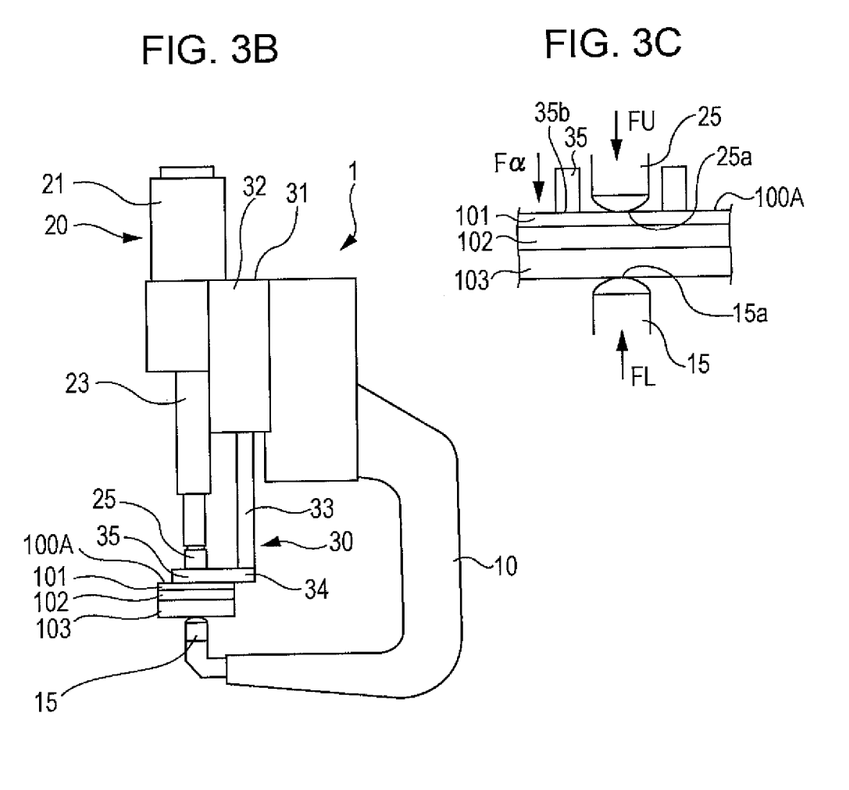

Subsequently, as shown in FIG. 3B, while having the fixed electrode 15 in contact with the second thick plate 103, the movable electrode 25 is moved by the servomotor 21 of the pressure actuator 20 from the retracted position toward the pressing position so as to be in contact with the thin plate 101 from above. The servomotor 21 is further driven such that the torque reaches a predetermined level, whereby the movable electrode 25 is brought into pressure contact with the thin plate 101. Thus, the pressure of the pressure actuator 20 is applied to the movable electrode 25 and the fixed electrode 15, whereby a weld section of the workpiece 100A is held and pressed between the movable electrode 25 and the fixed electrode 15.

Meanwhile, the rod of the linear motion unit is moved downward by the servomotor 32 of the sub pressure applicator 30, whereby the movable shaft 33 and the sub pressure applying arm 34 are moved such that the sub pressure unit 35 provided at the distal end of the sub pressure applying arm 34 moves to the second sub pressure position 35-3 where the lower end 35b of the sub pressure unit 35 is located adjacent to the movable electrode 25 and is in contact with the thin plate 101 of the workpiece 100A from above. The servomotor 32 is further driven such that the torque reaches a predetermined level, whereby the sub pressure unit 35 is brought into pressure contact with the thin plate 101 so as to apply a sub pressure Fα to the thin plate 101.

Thus, as shown in FIG. 3C, the pressure FU of the movable electrode 25 and the sub pressure Fα of the sub pressure unit 35 are applied to the thin plate 101, and the pressure FL of the fixed electrode 15 is applied to the second thick plate 103. Then, while the pressure FU of the movable electrode 25 located at the thin plate 101 side is set to be lower than the pressure FL of the fixed electrode 15 located at the second thick plate 103 side, welding is performed by applying current between the movable electrode 25 and the fixed electrode 15 from the welding transformer for a predetermined time period.

When current is applied between the movable electrode 25 and the fixed electrode 15, the contact resistance at the joint section between the thin plate 101 and the first thick plate 102 becomes relatively higher, making the current density greater, whereas the contact resistance between the first thick plate 102 and the second thick plate 103 remains small. Thus, the calorific value at the joint section between the thin plate 101 and the first thick plate 102 becomes relatively higher than the calorific value at the joint section between the first thick plate 102 and the second thick plate 103. Consequently, welding is performed without a variation in the current density across the thickness from the thin plate 101 to the second thick plate 103, thereby ensuring high weld strength and welding quality.

After completion of this welding process, the movable shaft 33 is moved upward by the servomotor 32 of the sub pressure applicator 30, whereby the sub pressure unit 35 provided on the sub pressure applying arm 34 is moved from the second sub pressure position 35-3, where the sub pressure unit 35 is in pressure contact with the workpiece 100A, to the second retracted position 35-4. Further, the movable electrode 25 is moved to its retracted position by the servomotor 21 of the pressure actuator 20 such that the workpiece 100A is released from being held by the fixed electrode 15 and the movable electrode 25.

Subsequently, the welding robot 40 is operated in accordance with the operation program so as to cause the spot welding apparatus 1 to retract from the spot position of the workpiece 100A and move to the next spot position of the workpiece 100A. Since the distance that the sub pressure unit 35 moves from the second retracted position 35-4 to the second sub pressure position 35-3 is relatively small, it is possible to reduce the time taken for moving the sub pressure unit 35 and thus to reduce the cycle time of the sub-pressure-application spot welding.

(Sub-pressure-application-non-requiring Spot Welding III)

Figure 4A:
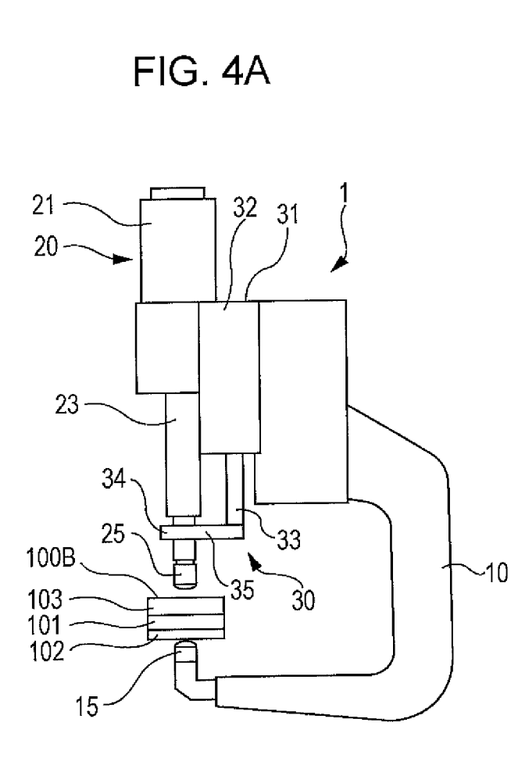
FIGS. 4A through 4C are diagrams schematically illustrating operations of the spot welding apparatus.

Upon spot-welding a workpiece 100B including a thin plate 101, and a first thick plate 102 and a second thick plate 103 that are disposed on opposite sides of the thin plate 101, in accordance with a preset program, the movable electrode 25 of the spot welding apparatus 1 is held in its retracted position away from the fixed electrode 15, and the sub pressure unit 35 of the sub pressure applicator 30 is held in the sub-pressure-non-requiring position 35-5. Then, the welding robot 40 is operated so as to position the spot welding apparatus 1 such that the tip end 15a of the fixed electrode 15 comes into contact from below with a spot position, i.e., a welding position of the workpiece 100B, as shown in FIG. 4A.

Figures 4B, 4C:
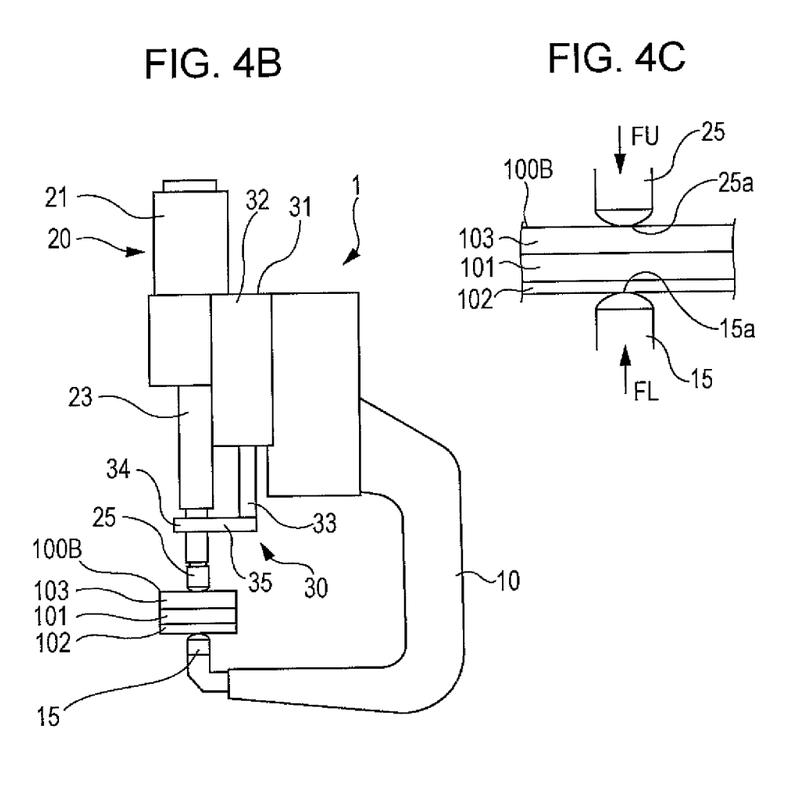

Subsequently, as shown in FIG. 4B, while having the fixed electrode 15 in contact with the first thick plate 102 of the workpiece 100B, the movable electrode 25 is moved by the servomotor 21 of the pressure actuator 20 from the retracted position toward the pressing position so as to be in contact with the second thick plate 103 from above. The servomotor 21 is further driven such that the torque reaches a predetermined level, whereby the movable electrode 25 is brought into pressure contact with the second thick plate 103. Thus, the pressure of the pressure actuator 20 is applied to the movable electrode 25 and the fixed electrode 15, whereby a weld section of the workpiece 100B is held and pressed between the movable electrode 25 and the fixed electrode 15.

Thus, as shown in FIG. 4C, the pressure FL of the fixed electrode 15 is applied to the first thick plate 102, and the pressure FU of the movable electrode 25 is applied to the second thick plate 103.

When the workpiece 100B is held and pressed between the fixed electrode 15 and the movable electrode 25 in the manner as described above, as schematically shown in FIG. 4C, the pressure of the pressure actuator 20 is applied to the movable electrode 25, so that the pressure FU of the movable electrode 25 applied to the second thick plate 103 and the pressure FL of the fixed electrode 15 applied to the first thick plate 102 become equal to each other (FU=FL). Thus, the contact pressure at the joint section between the first thick plate 102 and the thin plate 101 and the contact pressure at the joint section between the second thick plate 103 and the thin plate 101 become equal to each other.

Subsequently, while holding and pressing the workpiece 100B between the fixed electrode 15 and the movable electrode 25, welding is performed by applying current between the movable electrode 25 and the fixed electrode 15 from the welding transformer for a predetermined time period. When current is applied between the movable electrode 25 and the fixed electrode 15, the contact resistance between the first thick plate 102 and the thin plate 101 and the contact resistance between the second thick plate 103 and the thin plate 101 become equal to each other. Thus, the calorific value at the joint section between the first thick plate 102 and the thin plate 101 and the calorific value at the joint section between the second thick plate 103 and the thin plate 101 become equal to each other. Consequently, welding is performed without a variation in the current density across the thickness from the first thick plate 102 to the second thick plate 103, thereby ensuring high weld strength and welding quality.

After completion of this welding process, the movable electrode 25 is moved to its retracted position by the servomotor 21 of the pressure actuator 20 such that the workpiece 100B is released from being held by the fixed electrode 15 and the movable electrode 25.

Subsequently, the welding robot 40 is operated in accordance with the operation program so as to cause the spot welding apparatus 1 to retract from the spot position of the workpiece 100E and move to the next spot position of the workpiece 100B. In this sub-pressure-application-non-requiring spot welding process, the sub pressure unit 35 is held in the sub-pressure-non-requiring position. Thus, the sub pressure unit 35 is spaced relatively far away from the workpiece 100B, and therefore it is possible to provide sufficient operating space around the fixed electrode 15 and the movable electrode 25. It should be noted that this spot welding process is applicable to spot-welding of a workpiece formed of two stacked plates.

(Electrode Grinding IV)

If the spot welding apparatus 1 repeatedly performs spot welding, the tip end 15a of the fixed electrode 15 and the tip end 25a of the movable electrode 25 that come into contact with the workpiece 100 may become worn or deformed. The shapes of the worn or deformed tip ends 15a and 25a of the fixed electrode 15 and the movable electrode 25 affect the current density in the electric path and thus affect the welding quality. Therefore, an electrode grinding operation for shaping the tip ends 15a and 25a of the fixed electrode 15 and the movable electrode 25 is performed using an electrode grinder 50 shown in FIG. 5A, which is disposed in an operating area of the welding robot 40. The electrode grinding operation is performed every time a predetermined number of spots are welded.

Figure 5A:
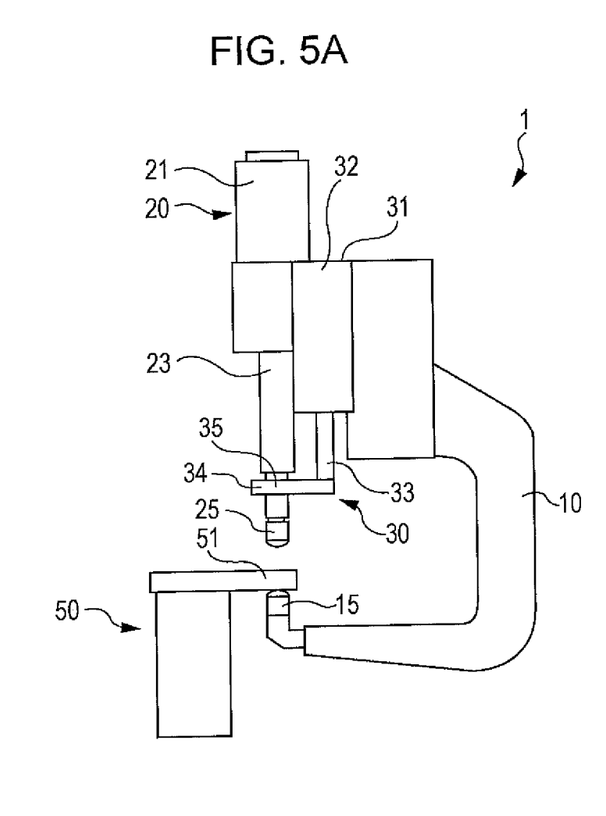
FIGS. 5A and 5B are diagrams schematically illustrating operations of the spot welding apparatus.

Since the electrode grinder 50 has a structure well known in the art and is not directly related to the present invention, a detailed description thereof will be omitted. The electrode grinder 50 includes an electrode grinding unit 51, which is provided with a cutting tool having a pair of upper and lower cutting surfaces, and a driving device for driving the cutting tool, for example.

When performing electrode grinding, in accordance with the preset operation program, the servomotor 21 of the pressure actuator 20 of the spot welding apparatus 1 is operated such that the movable electrode 25 provided on the sub pressure applying arm 34 is held at its retracted position, while the servomotor 32 of the sub pressure applicator 30 is operated such that the sub pressure unit 35 is moved and held at the sub-pressure-non-requiring position 35-5. Then, as shown in FIG. 5A, the welding robot 40 is operated so as to move the spot welding apparatus 1 toward the electrode grinding unit 51 of the grinder 50 and position the spot welding apparatus 1 such that the tip end 15a of the fixed electrode 15 comes into contact from below with the cutting tool while facing the movable electrode 25 with the cutting tool therebetween.

Figure 5B:
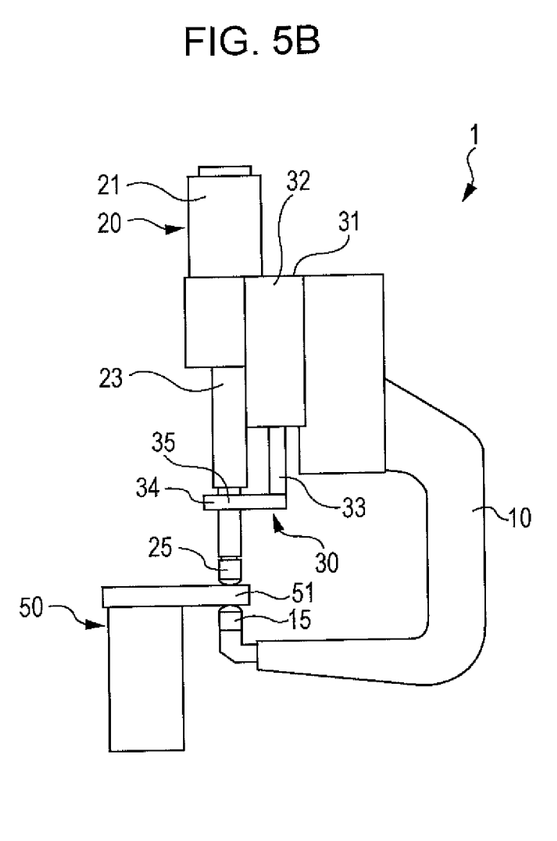

Then, as shown in FIG. 5B, while having the fixed electrode 15 in contact with the cutting tool, the servomotor 21 of the pressure actuator 20 rotates so as to move the movable electrode 25 from the retracted position toward the pressing position and press the tip end 15a of the fixed electrode 15 and the tip end 25a of the movable electrode 25 against the cutting tool from the lower side and the upper side, respectively. Then, the cutting tool is rotated, whereby the tip end 25a of the movable electrode 25 and the tip end 15a of the fixed electrode 15 are ground and shaped at the same time.

After completion of electrode grinding, the servomotor 21 of the pressure actuator 20 moves the movable electrode 25 to its retracted position so as to move the fixed electrode 15 and the movable electrode 25 away from the cutting tool. Also, the spot welding apparatus 1 is moved away from the grinder 50.

(Replacing Electrodes V)

Figure 6:
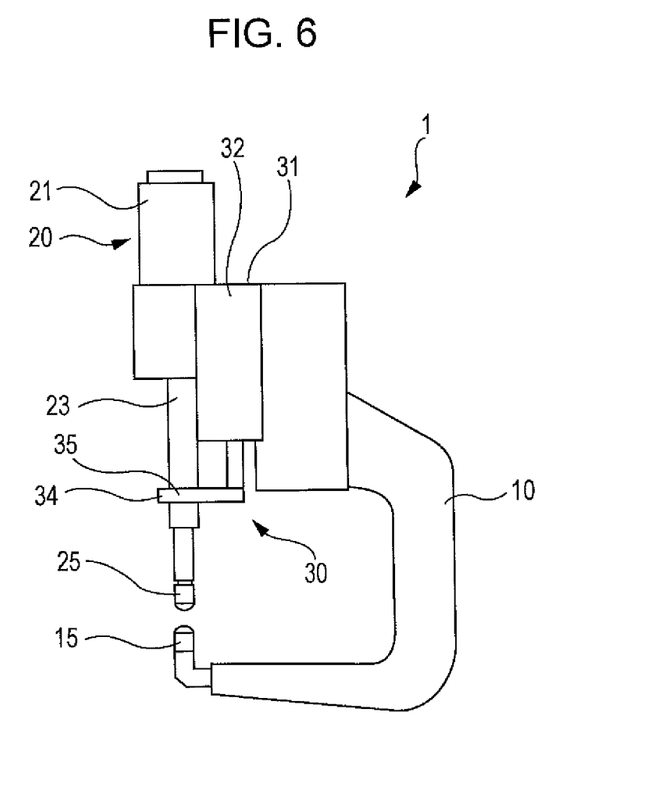
FIG. 6 is a diagram schematically illustrating operations of the spot welding apparatus.

When performing maintenance on the spot welding apparatus 1, such as replacing fixed electrodes 15 and movable electrodes 25, as shown in FIG. 6, the servomotor 21 of the pressure actuator 20 of the spot welding apparatus 1 is operated such that the movable electrode 25 is held at its retracted position away from the fixed electrode 15, and the servomotor 32 of the sub pressure applicator 30 is rotated so as to move the sub pressure unit 35 to the retreat position 35-6. When the sub pressure unit 35 is moved to the retreat position 35-6, sufficient operating space is provided around the fixed electrode 15 and the movable electrode 25. Thus, the operation of replacing fixed electrodes 15 by removing a fixed electrode 15 from the electrode holder 12 of the fixed arm 10 and attaching another fixed electrode 15 thereto is made easier. Also, the operation of replacing movable electrodes 25 by removing a movable electrode 25 from the electrode arm 23 and attaching another movable electrode 25 thereto is made easier. This makes it possible to achieve high workability in replacing fixed electrodes 15 and movable electrodes 25.

It should be noted that the present invention is not limited to the foregoing embodiment, and various modifications may be made without departing from the scope of the present invention. For example, in the above embodiment, the workpiece 100A including the thin plate 101, the first thick plate 102, and the second thick plate 103 that are stacked in this order from the bottom, the workpiece 100A including the thin plate 101, the first thick plate 102, and the second thick plate 103 that are stacked in this order from the top, and the workpiece 100B including the thin plate 101, and the first thick plate 102 and the second thick plate 103 disposed on opposite sides of the thin plate 101 are sequentially spot-welded. However, in the case of spot-welding a workpiece in which these different structures are present, it is possible to continuously spot-weld portions of these different structures by appropriately performing switching between the movement stop positions of the sub pressure applicator 30. Further, in the above embodiment, the movement stop positions where the servomotor 32 stops the sub pressure unit 35 are set to the first retracted position 35-1, the first sub pressure position 35-2, the second sub pressure position 35-3, the second retracted position 35-4, the sub-pressure-non-requiring position 35-5, and the retreat position 35-6. However, the sub-pressure-non-requiring position 35-5 may be set to the same position as the second retracted position 35-4 or the first retracted position 35-1. That is, the second retracted position 35-4 or the first retracted position 35-1 may also serve as the sub-pressure-non-requiring position 35-5. This simplifies the operation control of the sub pressure applicator 30. Further, one of a pair of the first retracted position 35-1 and the first sub pressure position 35-2 or a pair of the second sub pressure position 35-3 and the second retracted position 35-4 may be omitted depending on the type of the workpiece or the like. Furthermore, in the above embodiment, the sub pressure unit 35 has a semi-cylindrical shape. However, the sub pressure unit 35 may be formed in a cylindrical shape or may be a projection.

What is claimed is:
1. A spot welding apparatus comprising:
a first welding electrode;

a second welding electrode disposed to face the first welding electrode, the second welding electrode being configured to clamp and press a workpiece together with the first welding electrode; and a sub pressure applicator including a sub pressure applying actuator and a sub pressure unit and being configured to move and selectively stop the sub pressure unit at a plurality of movement stop positions using the sub pressure applying actuator, the movement stop positions including a sub pressure position where the sub pressure unit is adjacent to the first welding electrode and in contact with the workpiece so as to apply a sub pressure to the workpiece, and a sub-pressure-non-requiring position where the sub pressure unit is located away from the workpiece;

wherein the sub pressure applicator has an upper end of the sub pressure unit which is contactable with a lower face of the thin plate of the workpiece, and wherein the sub pressure applicator has a lower end of the sub pressure unit which is contactable with an upper face of the thin plate of the workpiece in an opposite direction of the upper end of the sub pressure unit.

2. The spot welding apparatus according to claim 1, wherein the plurality of movement stop positions include the sub pressure position where the sub pressure unit is in contact with the workpiece so as to apply the sub pressure to the workpiece, a retracted position where the sub pressure unit is located away from the workpiece so as to be retracted from the sub pressure position, and the sub-pressure-non-requiring position; and wherein a distance that the sub pressure unit moves from the sub pressure position to the sub-pressure-non-requiring position is greater than a distance that the sub pressure unit moves from the sub pressure position to the retracted position.

3. The spot welding apparatus according to claim 1, wherein the plurality of movement stop positions include the sub pressure position where the sub pressure unit is in contact with the workpiece so as to apply the sub pressure to the workpiece, a retracted position where the sub pressure unit is located away from the workpiece so as to be retracted from the sub pressure position, and the sub-pressure-non-requiring position; and wherein the retracted position also serves as the sub-pressure-non-requiring position.

4. The spot welding apparatus according to claim 1, wherein the sub pressure applicator is configured to linearly move and selectively stop the sub pressure unit at each of the movement stop positions using the sub pressure applying actuator.

5. The spot welding apparatus according to claim 2, wherein the sub pressure applicator is configured to linearly move and selectively stop the sub pressure unit at each of the movement stop positions using the sub pressure applying actuator.

6. The spot welding apparatus according to claim 3, wherein the sub pressure applicator is configured to linearly move and selectively stop the sub pressure unit at each of the movement stop positions using the sub pressure applying actuator.

7. The spot welding apparatus according to claim 1, wherein, if the sub pressure unit of the sub pressure applying actuator is switched to the sub pressure position, a pressure of the first welding electrode and the sub pressure of the sub pressure unit exerted by the sub pressure applying actuator are applied to the workpiece, then a pressure of the second welding electrode facing the first welding electrode is applied to the workpiece.

8. The spot welding apparatus according to claim 7, wherein the pressure of the first welding electrode is less than the pressure of the second welding electrode.

9. The spot welding apparatus according to claim 1, wherein the sub pressure unit is configured to share an opposite pressure to the first welding electrode with a pressure of the second welding electrode.

10. The spot welding apparatus according to claim 1, wherein, if the sub pressure unit of the sub pressure applicator is switched to the sub-pressure-non-requiring position, then the sub pressure unit is held in the sub-pressure-non-requiring position where the sub pressure unit is located away from the workpiece, and the first welding electrode and the second welding electrode apply a pressure of a same magnitude to the workpiece.

11. The spot welding apparatus according to claim 1, wherein, if the sub pressure unit of the sub pressure applying actuator is switched to the sub pressure position, a pressure of the first welding electrode and the sub pressure of the sub pressure unit exerted by the sub pressure applying actuator are applied to the workpiece, then a pressure of the second welding electrode facing the first welding electrode is applied to the workpiece, the pressure of the first welding electrode being less than the pressure of the second welding electrode, and wherein, if the sub pressure unit of the sub pressure applicator is switched to the sub-pressure-non-requiring position, then the sub pressure unit is held in the sub-pressure-non-requiring position where the sub pressure unit is located away from the workpiece, and the first welding electrode and the second welding electrode apply a pressure of a same magnitude to the workpiece.

* * * * *